US012618387B2

(12) United States Patent
Kahraman et al.

(10) Patent No.: US 12,618,387 B2
(45) Date of Patent: May 5, 2026

(54) VALVE ASSEMBLY FOR A FUEL PUMP

(71) Applicant: PHINIA DELPHI LUXEMBOURG SARL, Belvaux (LU)

(72) Inventors: Erol Kahraman, Maidstone (GB); Kevin Laity, Kent (GB)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/568,675

(22) PCT Filed: Jun. 9, 2022

(86) PCT No.: PCT/EP2022/065680

§ 371 (c)(1),
(2) Date: Dec. 8, 2023

(87) PCT Pub. No.: WO2022/258748

PCT Pub. Date: Dec. 15, 2022

(65) Prior Publication Data

US 2024/0209822 A1 Jun. 27, 2024

(30) Foreign Application Priority Data

Jun. 9, 2021 (GB) ..................................... 2108232

(51) Int. Cl.
*F02M 63/00* (2006.01)
*F02M 59/46* (2006.01)

(52) U.S. Cl.
CPC ...... *F02M 63/0017* (2013.01); *F02M 59/466* (2013.01)

(58) Field of Classification Search
CPC ......................... F02M 63/0017; F02M 59/466
See application file for complete search history.

(56) References Cited

U.S. PATENT DOCUMENTS 2,935,995 A * 5/1960 Rucker ............... F04B 53/1027
137/329.04
3,829,060 A * 8/1974 von Lewis .......... F16K 31/0665
251/129.02

(Continued)

FOREIGN PATENT DOCUMENTS

DE 102016202947 A1 8/2017
EP 0657641 A2 6/1995

OTHER PUBLICATIONS

Thyssenkrupp Materials NA, Copper and Brass Sales: A Blog About Metal and Processing, 2019, tkcopperandbrass, pp. 2-3 ( Year: 2019).*

(Continued)

*Primary Examiner* — Kurt Philip Liethen
(74) *Attorney, Agent, or Firm* — WARNER NORCROSS + JUDD LLP

(57) ABSTRACT

A valve assembly for a fuel pump for a fuel system, the fuel pump comprising a pump chamber and the valve assembly comprising a solenoid winding; and an electromagnetically controlled armature operable under the influence of an electromagnetic field generated by applying a current to the solenoid winding. The armature is coupled to a valve member cooperable with a valve seat to control fuel flow, and the armature is movable within an armature bore and is exposed to fuel within an armature chamber defined within the armature bore. The valve assembly includes a clearance defined between the armature and the armature bore which defines a variable restriction to the fuel flow, whereby during armature movement in use the fuel is displaced from the armature chamber through the variable restriction so that the speed of movement of the armature is reduced as the armature moves further into the armature chamber.

8 Claims, 6 Drawing Sheets

(56) References Cited

U.S. PATENT DOCUMENTS

| | | | | |
|---|---|---|---|---|
| 6,062,531 | A | 5/2000 | Rapp et al. | |
| 7,857,282 | B2 * | 12/2010 | Goossens | F16K 31/0693 251/129.02 |
| 9,528,484 | B2 * | 12/2016 | Gugel | F16K 1/34 |
| 2003/0089872 | A1 | 5/2003 | Furuta et al. | |
| 2012/0301340 | A1 | 11/2012 | Aritomi et al. | |
| 2021/0148320 | A1 * | 5/2021 | Iwata | F02M 59/466 |

OTHER PUBLICATIONS

SyBridge Technologies, How Chamfers and Fillets Impact Machining Costs, 2021, SyBridge, pp. 2-6 (Year: 2021).*
International Search Report for PCT/EP2022/065680 dated Sep. 21, 2022, 3 pages.
Machine assisted English translation of DE102016202947A1 obtained from https://worldwide.espacenet.com/patent on Dec. 5, 2023, 9 pages.

* cited by examiner

VALVE ASSEMBLY FOR A FUEL PUMP

CROSS-REFERENCE TO RELATED APPLICATIONS

This application is the U.S. National Stage of International Application No. PCT/EP2022/065680 filed on 9 Jun. 2022, which claims priority to and all advantages of United Kingdom Application No. 2108232.6 filed on 9 Jun. 2021, the contents of which are incorporated herein by reference.

FIELD OF THE INVENTION

This invention relates to a valve assembly for a fuel pump. In particular, but not exclusively, the invention relates to a valve assembly for use in a fuel pump of a compression ignition internal combustion engine.

BACKGROUND

In an internal combustion engine, fuel to a common rail fuel volume where the fuel is stored at high pressure prior to delivery to the fuel injectors of the engine. The common rail fuel pump typically includes at least one pumping plunger which is driven by means of a cam to perform a pumping cycle during which fuel is pressurised within a pump chamber associated with the plunger for delivery to the common rail. The plungers may be configured in many different layouts, from in-line arrangements to radial.

It is common for the pump assembly to include multiple plungers to provide an increased pump capacity. Each plunger typically has an associated valve assembly which is operable to control when in the pump cycle fuel is pressurised within the pump chamber and when fuel is drawn into the pump chamber for pressurisation. Electromagnetically controlled valves are commonly used for this purpose. Such valves include an electromagnetic actuator including a solenoid winding to which a current is supplied to create an electromagnetic field which acts on an armature coupled to a valve member. The valve member is movable towards a valve seat as the solenoid winding is energised, as the electromagnetic field acts on the armature which carries the valve member with it. Typically, the actuator may be the 'energise-to-close' type in which actuation of the solenoid winding causes the valve member to be drawn towards the valve seat, in which position fuel within the pump chamber is pressurised as the plunger is driven. The valve is caused to move away from the valve seat under the influence of a valve spring which acts against the actuation force of the actuator. The assembly is provided with a lift stop for the armature to limit the extent of movement of the armature (and hence the valve member) in the opening direction.

One problem which occurs in such an arrangement is that the valve member and the armature are moving at considerable speed when opening and the armature impacting the lift stop can cause damage to the armature and noise within the assembly. It is difficult to avoid this because the armature is made from a relatively soft, electromagnetic material so as to perform its function, but the material is easily damaged.

It is against this background that the invention has been devised.

STATEMENTS OF INVENTION

According to the present invention, there is provided a valve assembly for a fuel pump for a fuel system, the fuel pump comprising a pump chamber and the valve assembly comprising a solenoid winding and an electromagnetically controlled armature operable under the influence of an electromagnetic field generated by applying a current to the solenoid winding. The armature is coupled to a valve member which is cooperable with a valve seat to control fuel flow into and out of the pump chamber. The armature is movable within an armature bore and is exposed to fuel within an armature chamber defined within the armature bore, the valve assembly including a clearance defined between the armature and the armature bore which defines a variable restriction to the fuel flow, whereby during armature movement in use fuel is displaced from the armature chamber through the variable restriction so that the speed of movement of the armature is reduced as the armature moves further into the armature chamber.

The armature may be shaped to have an outer surface of variable diameter which defines the clearance, together with the armature bore.

For example, the outer surface of the armature may include a tapered region.

In one embodiment, the tapered region reduces the diameter of the armature from a smaller diameter at one end of the armature to a larger diameter in a central region of the armature.

A tapered region may be included on each side of the central region so that the upper and lower ends of the armature are of reduced diameter compared to the central region.

In another embodiment, the outer surface of the armature may include a stepped diameter.

The outer surface of the armature may, for example, include a central region of enlarged diameter.

The outer surface of the armature may be of reduced diameter on both upper and lower sides of the central region.

The armature bore may be shaped to have a variable internal diameter.

In other embodiments, the armature may have an outer surface of constant diameter, in which case the armature bore is shaped to have a variable internal diameter.

In some embodiments, the valve assembly may comprise a lift stop in the armature chamber which serves to limit the extent of movement of the armature into the armature chamber. The lift stop may be defined by the armature itself, obviating the need to have a separate lift stop in addition to the armature. It is possible to form the lift stop and the armature in one as the damping effect provided by the variable restriction reduces the effect of impact forces due to the armature hitting the lift stop at the end of movement.

According to another aspect of the invention, there is provided a valve assembly for a fuel pump for a fuel system, the fuel pump comprising a pump chamber and the valve assembly comprising a solenoid winding and an electromagnetically controlled armature operable under the influence of an electromagnetic field generated by applying a current to the solenoid winding. The armature is coupled to a valve member which is cooperable with a valve seat to control fuel flow into and out of the pump chamber. The armature is movable within an armature bore and is exposed to fuel within an armature chamber defined within the armature bore. The armature further defines a lift stop which serves to limit the extent of movement of the armature into the armature chamber (i.e. there is no need for a separate lift stop carried by the valve member). This is a convenient arrangement in which part count is reduced.

Typically, a lift stop surface defined by the armature comes into contact with a land defined within the armature chamber at the end of valve movement.

According to a further aspect of the invention, there is provided a fuel pump including a valve assembly in accordance with the first aspect.

It will be appreciated that the various features of the first aspect of the invention are equally applicable to, alone or in appropriate combination, the other aspects of the invention also.

BRIEF DESCRIPTION OF THE DRAWINGS

The above and other aspects of the invention will now be described, by way of example only, with reference to the accompanying drawings, in which.

SPECIFIC DESCRIPTION

Figure 1:
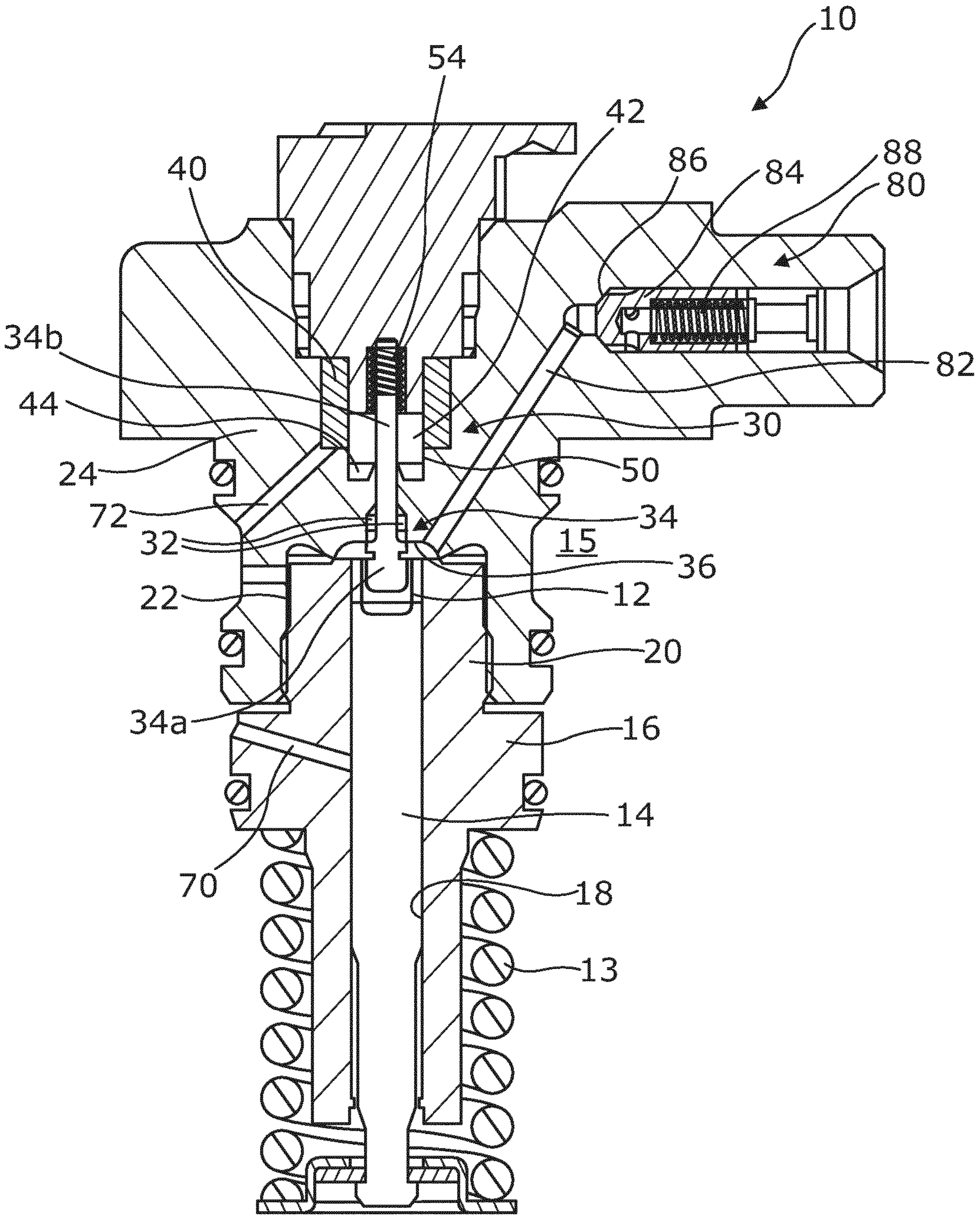
FIG. 1 is a cross section view of a known fuel pump assembly for a common rail fuel system.

The invention relates to a valve assembly of a common rail fuel pump assembly for use in a compression-ignition internal combustion engine. Referring to FIG. 1, the fuel pump includes a plurality of pump units (only one of which—10—is shown), each of which is configured to pressurise fuel within a pump chamber 12 of the pump unit when a pumping plunger 14 is driven by a cam drive arrangement. The pump assembly includes a drive shaft (not shown) which extends through a main pump housing 15, the drive shaft carrying a plurality of cam forms, each of which is arranged to drive an associated plunger through a pumping cycle. For the purpose of explaining the present invention, only one of the pump units 10 will be described in detail with reference to FIG. 1.

A barrel 16 of the pump unit 10 is received within the main pump housing 15 and is provided with a plunger bore 18 for receiving the pumping plunger 14. The barrel 16 includes a turret portion 20, the upper end of which is received within a recess 22 in a pump head housing (referred to hereinafter as the pump head) 24 mounted upon the barrel 16. The pump chamber 12 is defined within the turret portion 20. The plunger 14 is driven within the plunger bore 18, under the action of the driven cam, to perform a pump cycle in which fuel is drawn into the pump chamber 12, fuel is pressurised, and is then delivered from the pump assembly to the downstream parts of the system. A return spring 13 acts on the plunger 14 to effect a plunger return stroke which forms part of the pump cycle.

An inlet valve assembly 30 controls the supply of fuel to the pump chamber 12 when the fuel pump is in use. The fuel supply to the pump chamber 12, at a relatively low pressure level, occurs through a plurality of inlet channels 32, two of four of which are identified in the cross section shown (two of the four inlet channels 32 are not visible in this cross section). The inlet valve assembly 30 includes a valve member 34 which is aligned with the axis of the plunger 14. The inlet valve member 34 includes an upper stem region **34*b* and a lower head region 34*a*. The head region 34*a* defines a seating surface which is engageable with a valve seat 36 defined within the recess 22 in the pump head 24**.

The valve member 34 is moveable towards and away from the valve seat 36 so that, when the head region **34*a* of the valve member 34 is seated against the valve seat 36, fuel is unable to enter the pump chamber 12 through the inlet channels 32 as the flow route into the pump chamber 12 past the valve seat 36 is closed. When the valve member 34 is moved away from the valve seat 36 (downwards in the illustration shown) and the plunger 14 is withdrawn from the pump chamber 12 under the force of the return spring 13, the pump chamber volume is expanded and fuel is drawn into the pump chamber 12 past the open valve seat 36**.

The valve assembly 30 includes an electromagnetically operable actuator including a solenoid winding 40 and an armature 42. The armature 42 is made from a relatively soft magnetic material and is coupled to the valve member 34. The armature 42 resides within an armature chamber 44 defined within an armature bore provided in the pump head 24, with a lower surface of the armature 42 being exposed to fuel within the armature chamber 44.

A valve spring 54 is provided for the valve member 34 which tends to urge the valve member 34 away from the valve seat 36. Hence, by controlling the current that is supplied to the solenoid winding 40, movement of the valve member 34 towards and away from the valve seat 36 can be controlled precisely.

A drain path 70 exists from the plunger bore 18 back to a low pressure fuel drain (not shown). A further drain path 72 exists from a chamber surrounding the armature 42 to the low pressure fuel supply, as described in further detail below.

The fuel pump unit further includes an outlet valve arrangement 80 which communicates with the pump chamber 12 through a drilling 82 in the pump head 24. The drilling 82 communicates with the pump chamber 12. The outlet valve arrangement 80 includes an outlet valve 84 which is urged against an outlet valve seat 86 under the force of a valve spring 88. When the fuel pressure in the pump chamber 12, and hence in the drilling 82, exceeds a threshold sufficient to 35 overcome the force of the valve spring 88 (and other pressure in the downstream parts of the fuel system), the valve member 34 is lifted away from the outlet valve seat 86 and pressurised fuel is able to exit the pump unit to the downstream parts of the fuel system.

Figure 2:
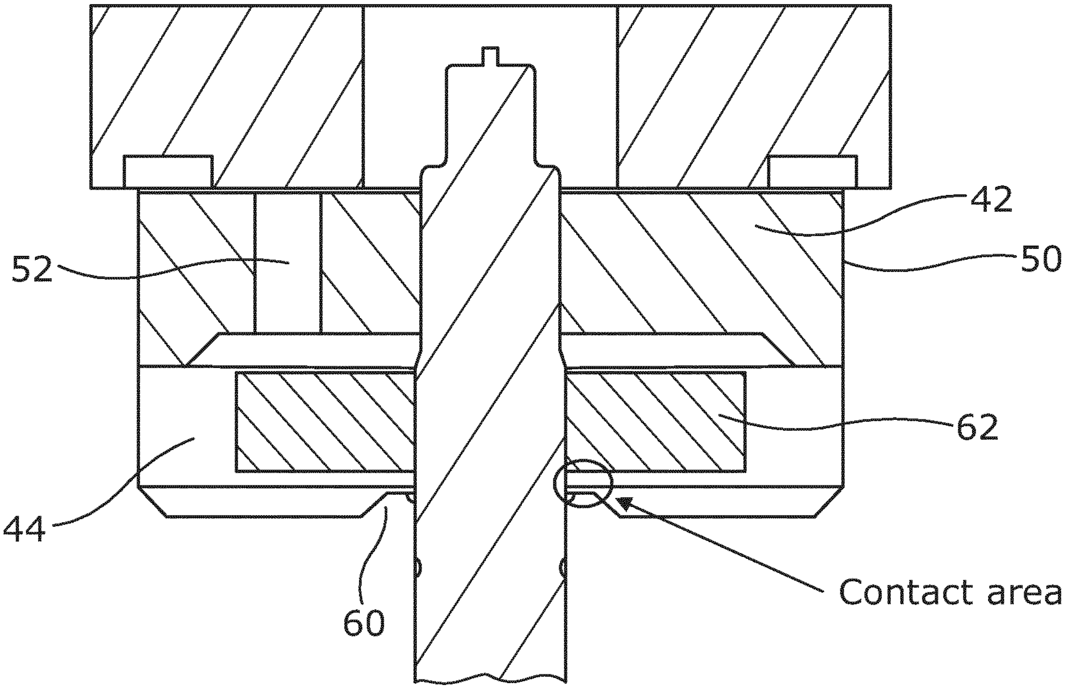
Figure 2 (Prior Art)
FIG. 2 is an enlarged cross section of an armature coupled to a valve member in the fuel pump assembly in FIG. 1.

Referring also to FIG. 2, a drilling 52 is provided within the armature chamber 44 to allow a restricted flow of fuel to pass through the armature 42 as the armature 42 moves into the armature chamber 44, displacing fuel from the chamber 44. In addition, a restricted flow of fuel is able to flow through a clearance 50, of uniform restriction, defined between the armature 42 and the armature bore. A lift stop surface is defined by a land 60 on the lower surface of the armature chamber 44. A lift stop member 62 carried by the valve member 34 is engageable with the land 60 as the valve member 34 is moved downwardly, under the valve spring force, when the winding is deenergised. The engagement between the lift stop member 63 and the land 60 limits the extent of movement of the valve member away from the actuator.

As a current is applied to the winding 40 an electromagnetic field is generated to attract the armature 42 towards the winding 40, pulling the armature 42 upwards (in the illustration shown) and moving the valve member 34 towards the valve seat 36. The clearance 50 allows fuel to be displaced from the armature chamber 44 when the armature 42 is caused to move away from the actuator under the valve spring force.

The presence of the drilling 52 in the armature 42, together with the clearance 50 around the armature 42, allows fuel within the armature chamber 44 to exit the chamber as the valve member 34 is urged downwardly under the spring force. The effect of this is that movement of the valve member 34 is damped as the lift stop 62 approaches the land 60, ensuring that contact between the lift stop 62 and the land 60 does not lead to damaging wear and/or the noise of vibration. However, the armature 42 is a very small component and the drilling operation is inconvenient and adds cost to the manufacturing process, so it is desirable to be able to avoid having to provide this feature.

Figure 3:
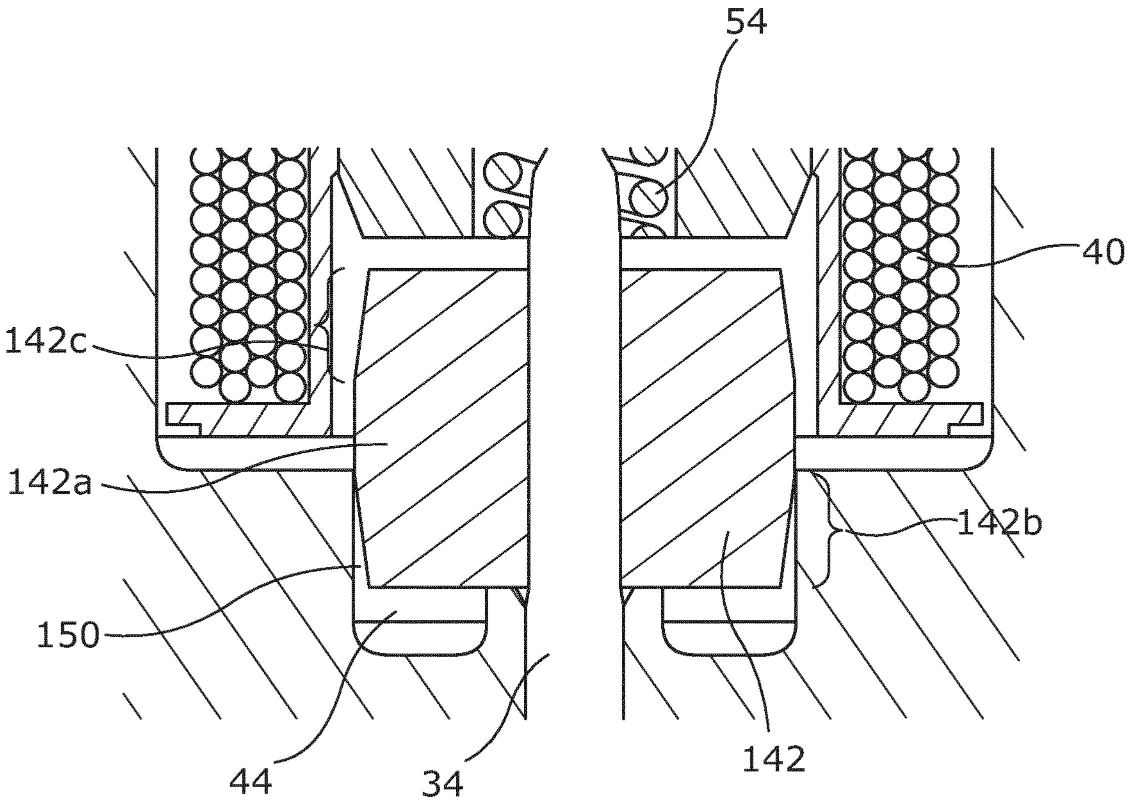
FIG. 3 is a cross section of an armature coupled to a valve member in a valve assembly of a first embodiment of the invention.
Figure 4:
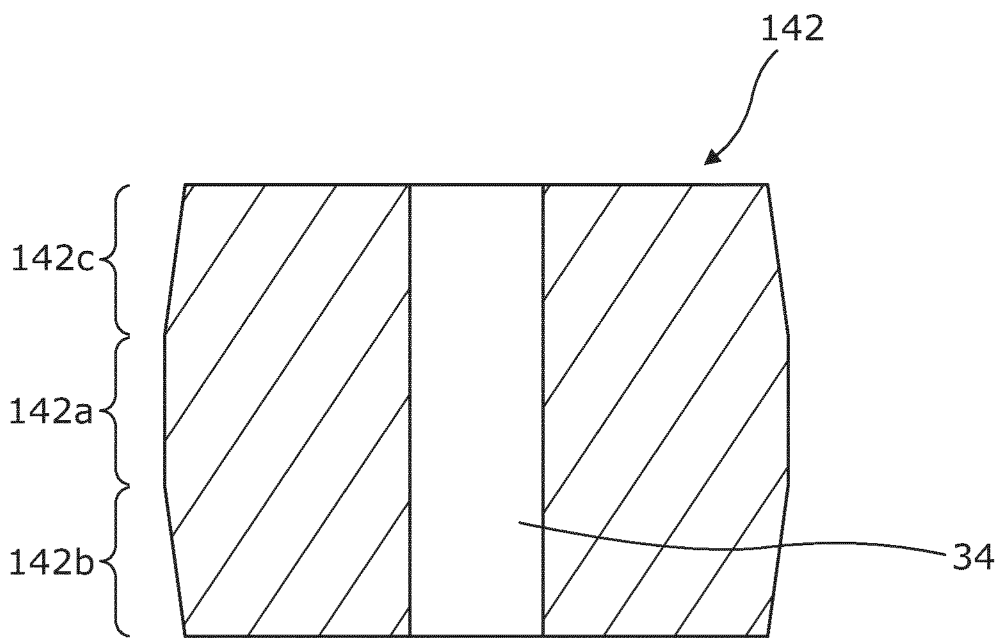
FIG. 4 is a view of the armature in FIG. 3 in isolation to illustrate the shaping of the outer surface of the armature more clearly.

Referring to FIGS. 3 and 4, the invention overcomes this problem by removing the need for the drilling through the armature. Instead, the outer surface of the armature 142 is shaped to define a clearance 150 between the outer surface of the armature 142 and the armature bore which varies in restriction through the range of travel of the armature 142. In addition, the lift stop and the armature are formed in one piece, so that the lift stop is no longer a separate part from the armature 142, thereby further simplifying manufacture.

The variable restriction to flow past the armature 142 may be achieved by shaping the outer surface of the armature 142 to include a tapered region, tapering from a relatively large diameter in a central region 142*a* of the armature towards a relatively smaller diameter at a lower end region 142*b* of the armature 142. In other words, the diameter of the armature 142 is greater in the central region 142*a* compared to the diameter at the lower end region 142*b*. The armature 142 is tapered in a similar fashion starting from the central region 142*a* of the armature and moving towards an upper end region 142*c* of the armature 142, so that the diameter of the armature at the upper end region 142*c* is smaller than the diameter in the central region 142.

To fully appreciate the benefits of the armature shaping, operation of the valve assembly through a pump cycle will be described with reference to FIGS. 1 and 3. The pump cycle includes a pumping stroke in which the plunger 14 (as shown in FIG. 1) is driven inwardly within the plunger bore 18 and fuel within the pump chamber 12 is pressurised to a high level suitable for injection. During a subsequent return stroke of the pump cycle, fuel is drawn into the pump chamber 12 as the plunger 14 retracts from the plunger bore before it is pressurised in the next pumping stroke.

Starting from the position in which the plunger 14 is at top dead centre (TDC), with the plunger 14 at the uppermost position within the plunger bore 18 pressurised fuel has just been delivered through the outlet passage 82 through the open outlet valve 80. The valve member 34 is closed against the valve seat 36 and fuel is unable to flow into the pump chamber 12 through the inlet channels 32.

As the plunger retracts from the plunger bore under the plunger return spring 13, and with the current removed from the winding 40, the valve member is held in the open position with the head region 34*a* of the valve member urged away from the valve seat 36 under the force of the valve spring 54. Continued movement of the plunger 14 through the return stroke causes fuel to be drawn into the pump chamber 12 past the open valve seat 36.

If an energising current is applied to the winding 40, the electromagnetic force which is generated as a result causes the armature 142, and hence the valve member 34, to move in an upwards direction (in the illustration shown) against the force of the spring 54, causing the valve member 34 to move towards the valve seat 36. When the valve member 34 engages with the valve seat 36 further fuel is prevented from entering the pump chamber 12 and, as the plunger 14 moves through the pumping stroke, the pump chamber volume reduces due to the advancing plunger 14 and pressurisation of fuel takes place. The energising current is maintained through the winding 40 for as long as it is required for the valve member 34 to remain seated against the valve seat 36.

As the valve member 34 is normally open, fuel is able to flow both into the pump chamber 12 and also back to inlet channels 32 and so any unwanted fuel is spilled back into the low pressure circuit. The fueling quantity is adjusted by spilling back some of fuel that has entered the pump chamber 12. This way it is more consistent since the pump chamber 12 will always be full and shot-to-shot (consecutive pumping instances) variation is minimized. Also, the duration for solenoid actuation will be constant, only long enough to close the valve member 34. The pressure rise in the pump chamber 12 will keep it closed.

It is desirable, when the winding 40 is energised, for movement of the armature 142 in an upwards direction (and hence movement of the head region 34*a* of the valve member 34 towards the valve seat 36) to occur rapidly so that closure of the valve member 34 occurs at a precisely-controlled point in the pump cycle. This 'closing movement' of the armature 142 can occur rapidly as there is no resistance to movement of the armature in an upwards direction; the variable restriction 150 between the armature 142 and the armature bore has no effect on the speed of armature movement. However, it is desirable for 'opening movement' of the armature 142 towards the land (and hence movement of the head region 34*a* of the valve member 34 away from the valve seat 36), to be controlled with greater precision so that there is no hard impact of the lift stop surface of the armature 142 as it contacts the land at the end of travel. During this downward movement, the armature 142 displaces fuel within the armature chamber 44 which is able to flow through the clearance 150 between the armature 142 and the armature bore.

Initially, the speed of movement of the armature 142 towards the land 60 is determined by the restriction 150 defined between the tapered region 142*b* at the lower end of the armature 142 and the armature bore. However, as the armature 142 moves further downward (in the illustration shown) the restriction is reduced in size, eventually being defined between the enlarged central region 142*a* of the armature 142 and the armature bore. The size of the restriction therefore varies with the distance of travel of the armature 142, with the restrictive effect increasing as the armature 142 approaches the land 60. As a result, the speed of movement of the armature 142 decreases as it approaches the land 60 so that the armature 142 comes to a gentle stop at the limit of travel. In other words, the assembly provides a variable restriction to the fuel flow so that the speed of movement of the valve member and the armature is reduced as the armature 142 moves further into the armature chamber 44 compared to the speed of movement as the armature 142 moves out of the armature chamber 44.

Although the taper of the lower region 142*a* of the armature 142 is essential in this embodiment to provide the variable restriction to flow for fuel escaping the armature chamber 142 as the actuator is energised to close the valve assembly 34, it will be appreciated that the upper tapered region 142*c* of the armature 142 does not need to be tapered for this reason as this region of the armature 142 does not influence the flow rate exiting the armature chamber 44.

However, there is a benefit to be obtained by shaping the armature 142 symmetrically on upper and lower sides of the central region. Because the armature component is so small, shaping the armature 142 with a taper on both the upper and lower ends 142*b*, 142*c* means that the part is easier to machine compared to providing just a single taper on one side. In addition, there is less scope for incorrect assembly of the part as the armature 142 can be assembled either way around.

It will be appreciated from the foregoing description that the armature 142, and hence the valve member 34, has a different speed of movement profile depending on the direction of movement towards or away from the land 60.

Figure 5:
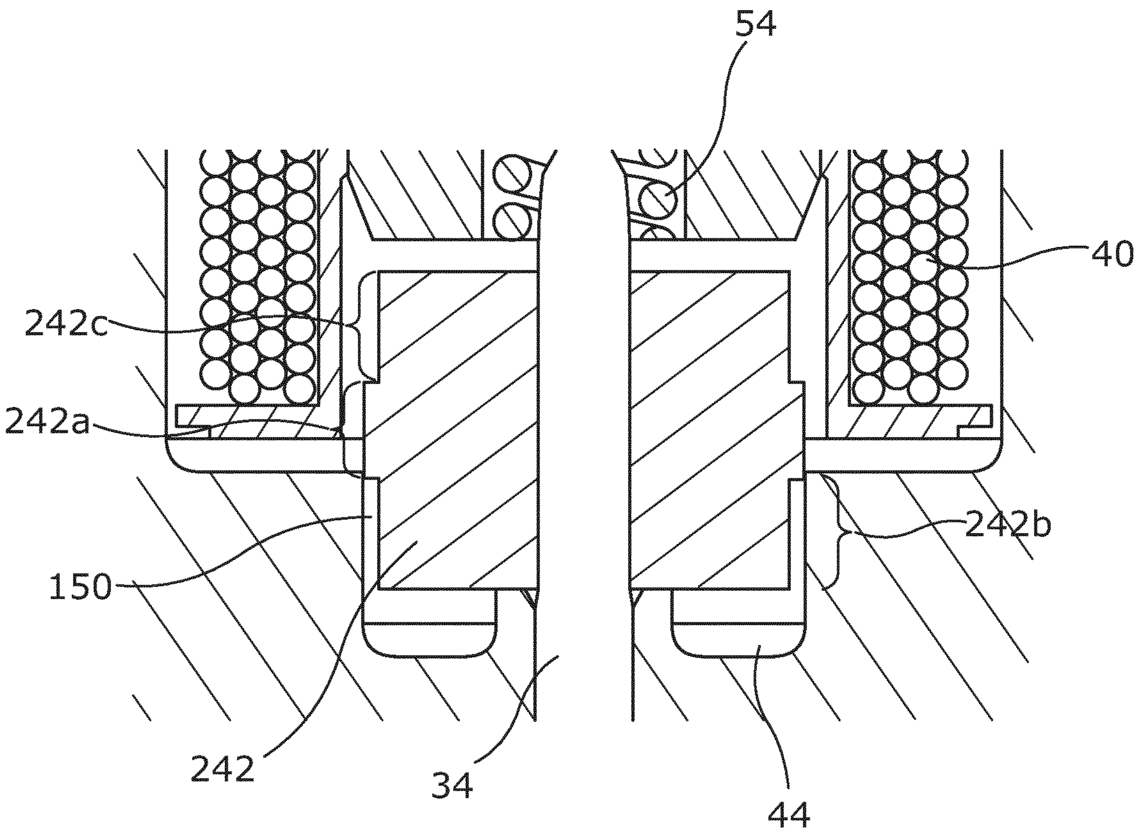
FIG. 5 is a cross section of an armature coupled to a valve member in a valve assembly of a second embodiment of the invention.
Figure 6:
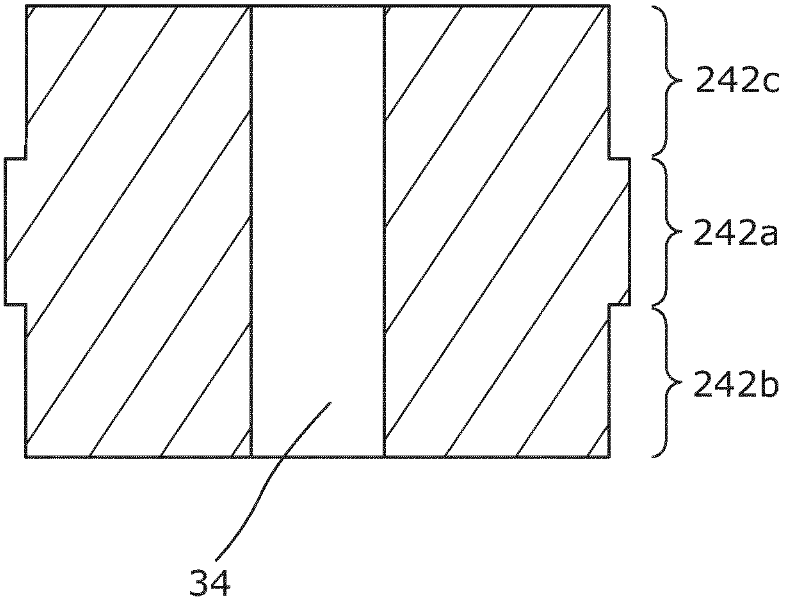
FIG. 6 is a view of the armature in FIG. 5 in isolation to illustrate the shaping of the outer surface of the armature more clearly.

As an alternative to providing the armature with a tapered lower region, and as shown in FIGS. 5 and 6, the outer surface of the armature 242 may be shaped to include a stepped region 242*a* of enlarged diameter in its central region that provides for a variable restriction to fuel flow escaping the armature chamber. The outer surface of the stepped region 242*a* defines the maximum effect of the restriction as the armature 242 moves downwards into the armature bore, with the upper and lower regions, 242*a*, 242*b* defining relatively smaller diameter regions. The overlap between the stepped region 242*a* and the armature bore visible in FIG. 5 demonstrates that the maximum restriction created by the stepped region 242*a* applies for a final portion of the downward stroke of the armature 242. Correspondingly, in the initial part of the downward stroke of the armature 242, the stepped region 242*a* is outside the armature chamber 44 and so the clearance 150 is defined by the narrower lower region 242*b* of the armature 242. So, the clearance 150 is larger at the beginning of the downward stroke than at the end of the downward stroke as the stepped region 242*a* of the armature 242 follows the lower region 242*b* into the armature chamber 44. In this way, the armature 242 of FIG. 5 provides a variable clearance with the armature bore, and hence a variable restriction to the fuel flow exiting the armature chamber 44.

As for FIG. 3, there is a benefit in providing the armature 242 with a symmetry about the central region 242*a* for ease of manufacture of the part and overall assembly.

A further benefit of the arrangement is that the armature itself defines the lift stop surface which contacts the land in the armature chamber at the end of valve movement. Hence, there is no need for an additional lift stop to be provided on the valve member, reducing part count. The controlled slowing of movement of the valve member as it moves towards the land lends itself to forming the armature and the lift stop as one part, as the soft material of the armature can withstand the impact force of the armature on the land as it comes to a controlled stop.

Other shaping of the armature is also envisaged to provide the desired variation in restriction between the armature and the armature bore, and hence the desired control of movement of the armature. For example, the outer surface of the armature may be provided with multiple steps towards a central region of enlarged diameter, rather than a region of smooth taper. It is also possible to create the desired variation in restriction by shaping the armature bore instead of, or in addition to, shaping the armature.

It will be appreciated that various other embodiments of the invention are also envisaged without departing from the scope of the appended claims.

The invention claimed is:

1. A valve assembly for a fuel pump for a fuel system, the fuel pump comprising a pump chamber, and the valve assembly comprising:

a solenoid winding;

an electromagnetically controlled armature operable under the influence of an electromagnetic field generated by applying a current to the solenoid winding, the armature being shaped to have an outer surface of variable diameter including a tapered region, and the armature being coupled to a valve member which is cooperable with a valve seat to control fuel flow into and out of the pump chamber, an armature chamber defined within an armature bore; and an armature lift stop defined within the armature chamber; wherein:

the armature is movable within the armature bore towards and away from the armature lift stop and is exposed to fuel within the armature chamber, the armature lift stop serves to limit the extent of movement of the armature into the armature chamber, the tapered region of the armature and the armature bore defining a variable clearance flow path out of the armature chamber which varies through the range of travel of the armature within the armature chamber so as to define a variable restriction to the fuel flow out of the armature chamber, and the variable clearance flow path reduces in size as the armature moves towards the armature lift stop, whereby during armature movement in use the fuel is displaced from the armature chamber through the variable clearance flow path so that the speed of movement of the armature is reduced as the armature moves further into the armature chamber towards the armature lift stop.

2. The valve assembly as claimed in claim 1, wherein the tapered region reduces the diameter of the armature from a smaller diameter at one end of the armature to a larger diameter in a central region of the armature.

3. The valve assembly as claimed in claim 2, including a tapered region on each side of the central region so that the upper and lower ends of the armature are of reduced diameter compared to the central region.

4. The valve assembly as claimed in claim 3, wherein the outer surface of the armature includes a central region of enlarged diameter.

5. The valve assembly as claimed in claim 4, wherein the outer surface of the armature is of reduced diameter on both upper and lower sides of the central region.

6. The valve assembly as claimed in claim 1, wherein the armature has an outer surface of constant diameter and wherein the armature bore is shaped to have a variable internal diameter.

7. The valve assembly as claimed in claim 1, wherein the armature bore is shaped to have a variable internal diameter.

8. A fuel pump comprising a valve assembly as claimed in claim 1.

* * * * *